(12) United States Patent
Kumagai et al.

(10) Patent No.: US 10,386,814 B2
(45) Date of Patent: Aug. 20, 2019

(54) MACHINING STATUS DISPLAY APPARATUS, AND NC PROGRAM GENERATING APPARATUS AND NC PROGRAM EDITING APPARATUS PROVIDED WITH THE SAME

(71) Applicant: DMG MORI CO., LTD., Nara (JP)

(72) Inventors: Norihiro Kumagai, Nara (JP); Shizuo Nishikawa, Nara (JP); Koji Iiyama, Nara (JP); Hiroki Nakao, Nara (JP)

(73) Assignee: DMG MORI CO., LTD., Nara (JP)

( * ) Notice: Subject to any disclaimer, the term of this patent is extended or adjusted under 35 U.S.C. 154(b) by 145 days.

(21) Appl. No.: 15/649,881

(22) Filed: Jul. 14, 2017

(65) Prior Publication Data

US 2018/0032054 A1 Feb. 1, 2018

(30) Foreign Application Priority Data

Aug. 1, 2016 (JP) .................................. 2016-151018

(51) Int. Cl.
*G05B 19/404* (2006.01)
*G05B 19/4093* (2006.01)

(52) U.S. Cl.
CPC ..... *G05B 19/404* (2013.01); *G05B 19/40937* (2013.01); *G05B 2219/36289* (2013.01)

(58) Field of Classification Search
CPC ............ G05B 19/404; G05B 19/40937; G05B 2219/36289
See application file for complete search history.

(56) References Cited

U.S. PATENT DOCUMENTS

| 3,784,798 | A | * | 1/1974 | Beadle | G05B 19/4163 700/173 |
| 6,990,238 | B1 | * | 1/2006 | Saffer | G06K 9/6218 382/224 |
| 2012/0179284 | A1 | * | 7/2012 | Nakamura | G05B 19/4068 700/160 |

(Continued)

FOREIGN PATENT DOCUMENTS

JP 06079581 A 3/1994

*Primary Examiner* — Mohammad Ali
*Assistant Examiner* — Vincent W Chang
(74) *Attorney, Agent, or Firm* — Miller, Matthias & Hull LLP

(57) ABSTRACT

A machining status display apparatus includes an achievement degree data storage storing achievement degree data relating to a degree of achievement of each of predetermined machining-related evaluation items within a range determined by attainable maximum and minimum values of the evaluation item and storing the degrees of achievement of the evaluation items obtained under each of predetermined sets of machining conditions in association with the set of machining conditions, a display part displaying the degrees of achievement of the evaluation items corresponding to a selected set of machining conditions by referring to the data in the achievement degree data storage, and an input part inputting a selection signal for selecting a set of machining conditions. The display part displays the degrees of achievement of the evaluation items obtained under the set of machining conditions corresponding to the selection signal by referring to the data in the achievement degree data storage.

10 Claims, 7 Drawing Sheets

(56) References Cited

U.S. PATENT DOCUMENTS

| | | | | |
|---|---|---|---|---|
| 2014/0127716 A1* | 5/2014 | Longo | ............... | G01N 33/5091 435/7.21 |
| 2014/0288692 A1* | 9/2014 | Kawashima | ..... | G05B 19/40937 700/160 |

* cited by examiner

FIG. 2

| Code | Machining conditions ||||| Evaluation item / Degree of achievement |||||||
| | Cutting speed | Feed rate | Width of cut | Depth of cut | Machining time | Machining accuracy | Tool life | Cutting efficiency | Spindle motor load | Feed motor load |
|---|---|---|---|---|---|---|---|---|---|---|
| C1 | max | max | max | max | 100 | 40 | 30 | 70 | 0 | 0 |
| C2 | max | max | max | middle | 96 | 40 | 28 | 65 | 2 | 0 |
| C3 | max | max | max | min | 94 | 45 | 26 | 65 | 4 | 4 |
| C4 | max | max | middle | max | 96 | 42 | 28 | 66 | 2 | 4 |
| C5 | max | max | middle | middle | 94 | 42 | 25 | 65 | 4 | 4 |
| C6 | max | max | middle | min | 90 | 45 | 22 | 60 | 8 | 6 |

MACHINING STATUS DISPLAY APPARATUS, AND NC PROGRAM GENERATING APPARATUS AND NC PROGRAM EDITING APPARATUS PROVIDED WITH THE SAME

BACKGROUND

Field of the Disclosure

The present disclosure relates to a display apparatus for displaying a machining status which is feasible in a machine tool, and an NC program generating apparatus and an NC program editing apparatus each provided with the display apparatus.

Background of the Disclosure

In the field of machining using an NC machine tool, there has been known an NC program generating apparatus that automatically generates an NC program. Such an NC program generating apparatus sets suitable cutting conditions, such as a spindle rotation speed and a tool feed rate, for each machining step in accordance with a machining step, a workpiece material, a tool material, a machining accuracy, and other factors.

A known example of such an apparatus capable of automatically setting cutting conditions is an automatic cutting condition setting apparatus disclosed in Japanese Unexamined Patent Application Publication No. H06-079581. This automatic cutting condition setting apparatus is configured such that inputting data relating to predetermined conditions for machining causes cutting conditions including a spindle rotation speed and a feed rate to be automatically determined based on data contained in a previously stored cutting condition table. This automatic cutting condition setting apparatus includes correction coefficient input means for inputting correction coefficients for the spindle rotation speed and the feed rate, and cutting condition correction means for correcting the automatically determined spindle rotation speed and feed rate with the correction coefficients input through the correction coefficient input means.

In this automatic cutting condition setting apparatus, inputting data relating to predetermined conditions for machining (for example, a step type, a machining diameter, tool dimensions, a machining direction, a surface roughness, a workpiece material, a tool material, etc.) causes cutting conditions including a spindle rotation speed and a feed rate to be automatically determined based on the input data as well as the data contained in the previously stored cutting condition table. When it is desired to correct the determined cutting conditions, inputting correction coefficients for the spindle rotation speed and the feed rate through the correction coefficient input means causes the automatically determined spindle rotation speed and feed rate to be corrected by the cutting condition correction means multiplying the spindle rotation speed and the feed rate by their respective correction coefficients, and the corrected spindle rotation speed and feed rate are set as cutting conditions.

Thus, with this conventional automatic cutting condition setting apparatus, automatically determined spindle rotation speed and feed rate can be freely corrected in setting cutting conditions; therefore, it is possible to flexibly respond to special machining conditions or an operator's intention with a simple operation.

SUMMARY OF THE DISCLOSURE

In the field of machining using an NC machine tool, efficient machining of a workpiece and cost reductions are of continued interest. At the same time, the demand for increased machining accuracy continues as technology advances. Therefore, in machining a workpiece with an NC machine tool, it is necessary to comprehensively consider machining efficiency, machining costs, and machining accuracy to set machining conditions (cutting conditions) which provide preferable machining efficiency, machining costs, and machining accuracy.

The manners in which machining efficiency, machining costs, and machining accuracy are pursued, however, are often in tension, and operators often do not have sufficient knowledge about them. For example, in the case of using a milling cutter, improvement of machining efficiency, that is, shortening of a machining time can be achieved by increasing a width of cut and a depth of cut of the milling cutter and increasing a tool rotation speed and a tool feed rate. However, such an approach increases power consumption and shortens a tool life, which will be factors of increase of machining costs. Further, increase of the width of cut and the depth of cut and increase of the feed rate will be factors of deterioration of machining accuracy.

Thus, machining-related evaluation items which are associated with machining efficiency, machining costs, and machining accuracy (for example, a machining time, a machining accuracy, and a tool life) are in tension with each other, and their mutual relationship is quite complicated. Therefore, operators who have no skilled knowledge do not have accurate knowledge about their mutual relationship.

Therefore, when correcting automatically determined standard cutting conditions in the above-described conventional automatic cutting condition setting apparatus, an ordinary operator cannot determine what correction coefficients should be used for the correction to obtain preferable cutting conditions which are based on comprehensive consideration of machining efficiency, machining costs, and machining accuracy. As a matter of fact, such an automatic cutting condition setting apparatus cannot set preferable cutting conditions based on the above-described comprehensive consideration.

On the other hand, if the operator can recognize the mutual relationship between the machining-related evaluation items associated with machining efficiency, machining costs, and machining accuracy corresponding to machining conditions, he can easily set or adjust machining conditions taking the recognized relationship into account. Further, the operator also can generate an NC program in which preferable machining conditions based on comprehensive consideration of the evaluation items are reflected, or can modify an existing NC program such that such preferable machining conditions are reflected in the NC program.

The present disclosure has been achieved in view of the above-described circumstances, and an object thereof is to provide a machining status display apparatus which is configured such that degrees of achievement of predetermined machining-related evaluation items obtained under predetermined machining conditions are displayed in association with each other, the degree of achievement of each evaluation item being indicated within a range between an attainable maximum value and an attainable minimum value of the evaluation item, as well as provide an NC program generating apparatus and an NC program editing apparatus each provided with the machining status display apparatus.

A machining status display apparatus according to a first mode of the present disclosure for solving the above-described problems includes:

an achievement degree data storage storing machining condition data relating to each of a plurality of predetermined sets of machining conditions and achievement degree data relating to degrees of achievement of a plurality of predetermined machining-related evaluation items obtained in machining under each of the sets of machining conditions, the achievement degree data indicating the degree of achievement of each of the evaluation items within a range determined by attainable maximum and minimum values of the evaluation item, the machining condition data and the achievement degree data being associated with each other;

a display part having a display and displaying, on the display, the degrees of achievement of the evaluation items corresponding to a selected set of machining conditions by referring to the machining condition data and achievement degree data stored in the achievement degree data storage; and an input part inputting a selection signal for selecting a set of machining conditions from among the plurality of sets of machining conditions, the display part being further configured to, when the selection signal is input from the input part, recognize the degree of achievement of each of the evaluation items obtained under the set of machining conditions corresponding to the selection signal by referring to the data stored in the achievement degree data storage based on the input selection signal, and display the recognized degree of achievement of each of the evaluation items.

In this machining status display apparatus, when an operator inputs a selection signal for selecting a specific set of machining conditions from among the plurality of sets of machining conditions through the input part, the display part recognizes the degree of achievement of each of the plurality of evaluation items obtained under the set of machining conditions corresponding to the input selection signal by referring to the data stored in the achievement degree data storage based on the input selection signal, and displays the recognized degree of achievement of each of the evaluation items on the display.

Note that, as for the evaluation items, for example, three or more items can be selected from among "machining time", "machining accuracy", "tool life", "cutting efficiency (=cutting volume per unit of power)", "spindle motor load", "feed motor load", etc.; however, the present disclosure is not limited thereto. As for the above-mentioned items, "machining time" and "cutting efficiency" are factors influencing machining efficiency, while "tool life", "spindle motor load", and "feed motor load" are factors influencing machining costs. Further, machining costs are influenced also by machining efficiency. Furthermore, the concept of "machining accuracy" includes surface roughness of a machined surface.

The degree of achievement of each evaluation item, as described above, indicates an achievement level of the evaluation item within a range determined by attainable maximum and minimum values of the evaluation item. For example, in the case where the degree of achievement for the maximum value and the degree of achievement for the minimum value are set to "100" and "0", respectively, the degree of achievement for the middle achievement level between the maximum and minimum values is "50".

Further, the set of machining conditions depends on the mode of machining. For example, in the case of milling, the set of machining conditions contains "depth of cut [mm]", "width of cut [mm]", "feed rate [m/min]", and "cutting speed [m/min]"; in the case of turning, the set of machining conditions contains "depth of cut [mm]", "feed rate [mm/rev]", and "cutting speed [m/min]"; and in the case of drilling, the set of machining conditions contains "feed rate [m/min]" and "cutting speed [m/min]".

Thus, with this machining status display apparatus, when an operator inputs, for example, a set of machining conditions in which he is interested, the degree of achievement of each of the evaluation items obtained under the set of machining conditions is recognized and the recognized degree of achievement of each of the evaluation items is displayed on the display; therefore, the operator can easily recognize the degrees of achievement of the evaluation items obtained under the set of machining conditions.

Visually recognizing the degrees of achievement of the evaluation items corresponding to a set of machining conditions displayed in the above-described manner enables the operator to easily recognize and extract a set of machining conditions under which the degrees of achievement of the evaluation items are comprehensively well-balanced, or a set of machining conditions under which the degrees of the achievement of the evaluation items are in his desired state; therefore, the operator can obtain a preferable set of machining conditions which is based on comprehensive consideration of machining efficiency, machining costs, and machining accuracy.

In a machining status display apparatus according to a second mode of the present disclosure, the display part according to the first mode is configured to, when the selection signal is input from the input part, recognize the degree of achievement of each of the evaluation items obtained under the set of machining conditions corresponding to the selection signal by referring to the data stored in the achievement degree data storage based on the input selection signal, and display the degree of achievement of each of the evaluation items with a figure, the figure being composed of an axial figure having a length corresponding to the range determined the maximum and minimum values of the evaluation item, and an index figure arranged at a length position corresponding to a proportion corresponding to the degree of achievement of the evaluation item on the axial figure.

With this machining status display apparatus, the degree of achievement of each of the evaluation items is displayed with a figure composed of an axial figure and an index figure; therefore, the operator can instantaneously and intuitively recognize the degree of achievement of each of the evaluation items.

Further, in a machining status display apparatus according to a third mode of the present disclosure, the display part according to the second mode is configured to display the axial figures for the evaluation items such that the axial figures are arranged in parallel with each other with both ends thereof located uniformly in an axial direction.

Further, in a machining status display apparatus according to a fourth mode of the present disclosure, the display part according to the second mode is configured to display the axial figures for the evaluation items such that the axial figures are radially arranged at equal angular intervals with respect to a determined reference point with minimum-value-side ends thereof located at the reference point.

Further, in a machining status display apparatus according to a fifth mode of the present disclosure, the display part according to the third mode or the fourth mode is configured to display line segments connecting the index figures adjacent to each other. With this configuration, the operator can instantaneously and intuitively recognize the state of balance between the degrees of achievement of the evaluation items.

Further, in a machining status display apparatus according to a sixth mode of the present disclosure, the display part according to any one of the first to fifth modes is configured to display a list of the sets of machining conditions or a list of codes corresponding to the sets of machining conditions. With this configuration, the operator can easily specify a set of machining conditions to be selected. Furthermore, in a machining status display apparatus according to a seventh mode of the present disclosure, the input part according to the sixth mode is configured to be capable of inputting a selection signal for selecting a set of machining conditions from the list displayed on the display part. With this configuration, the operator can easily input a selection signal for selecting a set of machining conditions.

Further, an NC program generating apparatus according to the present disclosure includes:

the machining status display apparatus according to any one of the first to seventh modes;

a basic data storage storing basic data for automatically generating an NC program, the basic data including the machining condition data;

an NC program generator generating an NC program based on the basic data stored in the basic data storage; and a basic data updater updating the machining condition data stored in the basic data storage, the input part being further configured to be capable of inputting an update request signal for causing the machining condition data stored in the basic data storage to be updated with the set of machining conditions corresponding to the selection signal, and the basic data updater being configured to, when the update request signal is input from the input part, update the machining condition data stored in the basic data storage with the machining condition data corresponding to the selection signal.

In this NC program generating apparatus, an NC program is automatically generated based on the basic data stored in the basic data storage by the NC program generator. Further, when the update request signal is input from the input part of the machining status display apparatus, corresponding machining condition data stored in the basic data storage is updated with the machining condition data corresponding to the selection signal by the basic data updater.

Thus, with this NC program generating apparatus, for example, an operator confirms a set of machining conditions under which the degrees of achievement of the evaluation items are comprehensively well-balanced or a set of machining conditions under which the degrees of achievement of the evaluation items are in his desired state while checking the degrees of achievement of the evaluation items obtained under a set of machining conditions selected as appropriate with the machining status display apparatus in the above-described manner, and then updates corresponding machining condition data stored in the basic data storage with the recognized set of machining conditions, whereby the basic data (machining condition data) for generating an NC program can be adjusted to preferable machining conditions which are based on comprehensive consideration of the evaluation items associated with machining efficiency, machining costs, and machining accuracy. Updating the machining condition data in this manner enables automatic generation of an NC program which provides comprehensively preferable degrees of achievement of the evaluation items.

Furthermore, an NC program editing apparatus according to the present disclosure includes:

the machining status display apparatus according to any one of the first to seventh modes;

an NC program storage storing an NC program; and an NC program editor editing the NC program stored in the NC program storage, the input part being further configured to be capable of inputting an editing request signal specifying a portion to be edited of the NC program stored in the NC program storage and requesting to edit the specified portion with the set of machining conditions corresponding to the selection signal, and the NC program editor being configured to, when the editing request signal is input from the input part, edit the specified portion of the NC program stored in the NC program storage with the machining condition data corresponding to the selection signal.

In this NC program editing apparatus, when the editing request signal is input from the input part, the specified portion of the NC program stored in the NC program storage is edited with the machining condition data corresponding to the selection signal by the NC program editor.

For example, an operator confirms a set of machining conditions under which the degrees of achievement of the evaluation items are comprehensively well-balanced or a set of machining conditions under which the degrees of achievement of the evaluation items are in his desired state while checking the degrees of achievement of the evaluation items obtained under a set of machining condition selected as appropriate with the machining status display apparatus in the above-described manner. Thereafter, if the operator inputs, through the input part, an editing request signal with a portion to be edited of the NC program stored in the NC program storage specified, the specified portion of the NC program stored in the NC program storage is edited with the machining condition data corresponding to the selection signal. Editing the specified portion of the NC program with such machining condition data enables machining corresponding to the specified portion to be adjusted to machining which provides comprehensively preferable degrees of achievement of the evaluation items.

As described in detail above, with the machining status display apparatus according to the present disclosure, when an operator inputs a set of machining conditions, the degrees of achievement of the evaluation items obtained under the set of machining conditions are displayed on the display; therefore, the operator can easily recognize the degrees of achievement of the evaluation items obtained under the set of machining conditions. Further, visually recognizing the degrees of achievement of the evaluation items corresponding to a set of machining conditions displayed in the above-described manner enables the operator to easily recognize and extract a set of machining conditions under which the degrees of achievement of the evaluation items are comprehensively well-balanced or a set of machining conditions under which the degrees of achievement of the evaluation items are in his desired state; therefore, the operator can obtain a preferable set of machining conditions which is based on comprehensive consideration of machining efficiency, machining costs, and machining accuracy.

Further, with the NC program generating apparatus according to the present disclosure, the basic data (machining condition data) for generating an NC program can be adjusted to preferable machining conditions which are based on comprehensive consideration of the evaluation items associated with machining efficiency, machining costs, and machining accuracy, and adjustment to such machining conditions enables automatic generation of an NC program which provides comprehensively preferable degrees of achievement of the evaluation items.

Further, with the NC program editing apparatus according to the present disclosure, preferable machining conditions which are based on comprehensive consideration of the evaluation items associated with machining efficiency, machining costs, and machining accuracy can be set for machining corresponding to a specified portion of an existing NC program.

BRIEF DESCRIPTION OF THE DRAWINGS

FIG. 2 is an illustration for explaining data stored in an achievement degree data storage in the embodiment;

DETAILED DESCRIPTION

Figure 1:
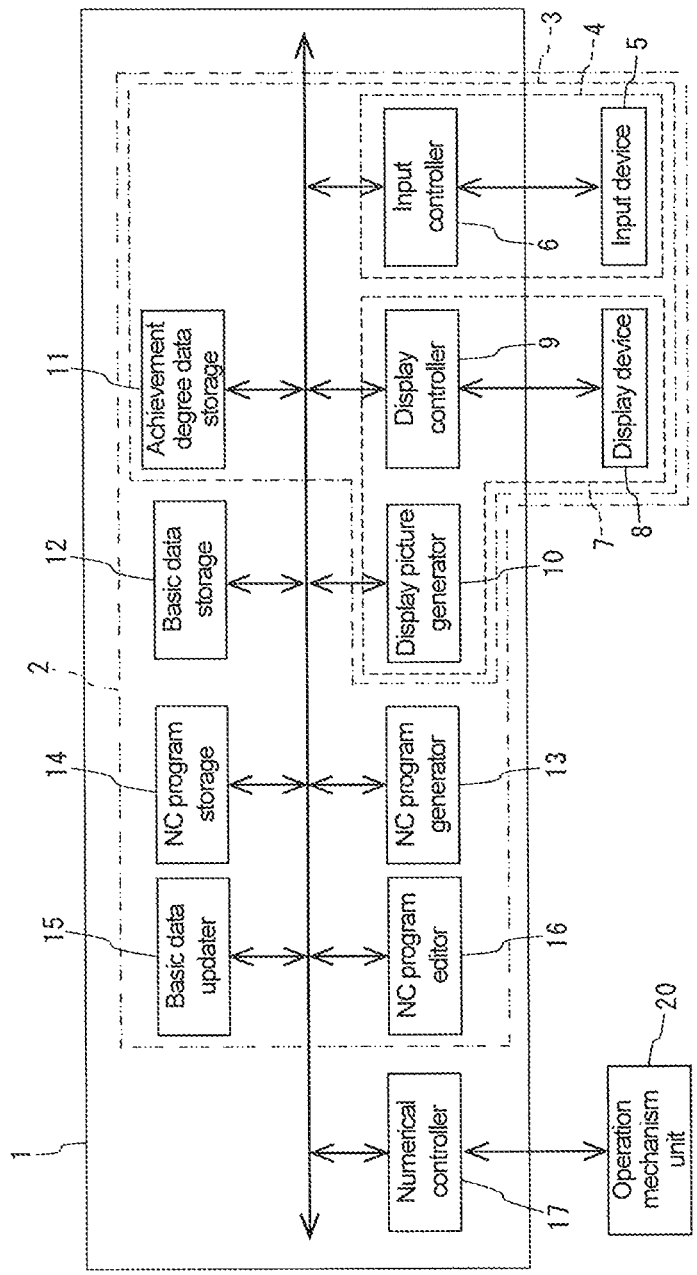
FIG. 1 is a block diagram showing a schematic configuration of an NC program generating and editing apparatus according to an embodiment of the present disclosure.

Hereinafter, a specific embodiment of the present disclosure will be described with reference to the drawings. FIG. 1 is a block diagram showing a schematic configuration of an NC program generating and editing apparatus according to the embodiment.

As shown in FIG. 1, the NC program generating and editing apparatus 2 according to this embodiment includes a machining status display apparatus 3, a basic data storage 12, an NC program generator 13, an NC program storage 14, an NC program editor 16, and a basic data updater 15. Further, the machining status display apparatus 3 includes an achievement degree data storage 11, a display picture generator 10, an input controller 6, a display controller 9, an input device 5, and a display device 8. Each of the above-mentioned components is described in detail below.

Note that the input controller 6, the display controller 9, the display picture generator 10, the achievement degree data storage 11, the basic data storage 12, the NC program generator 13, the NC program storage 14, the NC program editor 16, and the basic data updater 15 are incorporated in a numerical control apparatus 1 of an appropriate NC machine tool. Besides these components, a numerical controller 17 numerically controlling an operation mechanism unit 20 of the NC machine tool is provided in the numerical control apparatus 1. The numerical control apparatus 1 is composed of a computer including a CPU, an ROM, and an RAM. Further, the functions of the input controller 6, the display controller 9, the display picture generator 10, the NC program generator 13, the NC program editor 16, the basic data updater 15, and the numerical controller 17 are achieved by computer programs, and the achievement degree data storage 11, the basic data storage 12, and the NC program storage 14 are each composed of an appropriate storage medium such as an RAM.

First, a configuration of the machining status display apparatus 3 is described. As described above, the machining status display apparatus 3 in this embodiment includes the input controller 6, the display controller 9, the display picture generator 10, the achievement degree data storage 11, the input device 5, and the display device 8.

Note that, in this embodiment, the display picture generator 10, the display controller 9, and the display device 8 constitute a display part 7, and the input controller 6 and the input device 5 constitute an input part 4. Further, the display device 8 can be composed of a display which is provided on an operation panel of the machine tool, and the input device 5 can be composed of an input and output interface and a keyboard which are also provided on the operation panel of the machine tool.

The display controller 9 and the input controller 6 constitute a so-called user interface; the display controller 9 controls display of pictures on the display device 8, and the input controller 6 controls transmission of data and signals input from the input device 5.

For example, the display controller 9 displays display pictures generated by the display picture generator 10 on the display device 8. Further, upon receiving an operation signal input from the input device 5 via the input controller 6, the display controller 9 scrolls a displayed picture, moves a pointer on a displayed picture, or moves an image on a displayed picture.

Further, the input controller 6, as described above, transmits an operation signal input from the input device 5 to the display controller 9. Further, for example, upon receiving a determination signal input from the input device 5, the input controller 6 recognizes the position of the pointer or the position of a specified image on a picture displayed on the display device 8 via the display controller 9, and transmits an input signal corresponding to the recognized position to the display picture generator 10 and to the NC program generator 13, the NC program editor 16, or the basic data updater 15, which will be described in detail later. Note that these functions of the display device 8 and input device 5 are achieved by a touch panel or the like which is also provided on the operation panel of the machine tool.

Further, the input controller 6 stores achievement degree data, etc. input from the input device 5 into the achievement degree data storage 11, stores basic data input from the input device 5 into the basic data storage 12, and stores an NC program input from the input device 5 into the NC program storage 14.

The achievement degree data storage 11 is a functional unit that stores, with respect to predetermined tool and workpiece, data relating to each of a plurality of predetermined sets of machining conditions and achievement degree data relating to degrees of achievement of evaluation items obtained in machining under each of the sets of machining conditions, the machining condition data and the achievement degree data being associated with each other. Specifically, these data are stored in the form of a data table as shown in FIG. 2, for example.

The set of machining conditions depend on a tool type (the mode of machining). For example, in the case of milling, the set of machining conditions contains "depth of cut [mm]", "width of cut [mm]", "feed rate [m/min]", and "cutting speed [m/min]"; in the case of turning, the set of machining conditions contains "depth of cut [mm]", "feed rate [mm/rev]", and "cutting speed [m/min]"; and in the case of drilling, the set of machining conditions contains "feed rate [m/min]" and "cutting speed [m/min]".

The example shown in FIG. 2 shows sets of machining conditions for milling. A maximum value (max) and a minimum value (min), which are recommended by the manufacturer of the tool, and a middle value (middle) between the maximum and minimum values are used for each machining condition, and 81 sets of machining conditions are set by combining the three values in order and the 81 sets of machining conditions are respectively assigned codes C1 to C81. Note that, in this embodiment, the terms "maximum value (max)", "minimum value (min)", and "middle value (middle)" are used for the purpose of conceptual explanation; however, actually the machining conditions are set with specific numerals (the same applies to the following descriptions).

Further, trial machining is performed with the corresponding tool and workpiece under each of the sets of machining conditions, and the following evaluation items: "machining time", "machining accuracy" "tool life", "cutting efficiency", "spindle motor load", and "feed motor load" are actually measured. Note that the evaluation item "machining time" is an amount of time required for machining a predetermined volume of the workpiece, and the evaluation item "machining accuracy" is surface roughness of the workpiece having been machined with the predetermined volume. Further, the evaluation item "spindle motor load" is a mean load acting on a spindle motor during the machining of the predetermined volume, and the evaluation item "feed motor load" is a mean load acting on a feed motor during the machining of the predetermined volume. Furthermore, the evaluation item "cutting efficiency" is a cutting volume per unit of power, which can be calculated by measuring integral power consumption of the spindle motor and the feed motor during the machining of the predetermined volume and dividing the predetermined volume by the measured integral power consumption. Furthermore, the evaluation item "tool life" is a machining time taken until a tool wear amount reaches a predetermined amount.

The degree of achievement of each evaluation item under each set of machining conditions indicates at what level (achievement level) the value obtained under the set of machining conditions lies within a range determined by the largest and smallest values of all the actually measured data for the evaluation item. For example, in the case where the degree of achievement for the largest value is set to "100" and the degree of achievement for the smallest value is set to "0", when the exact middle value between the largest and smallest values is obtained under a certain set of machining conditions, the degree of achievement (achievement level) under the set of machining conditions is "50".

Thus, for each of the evaluation items, the degree of achievement under each of the sets of machining conditions is calculated based on the actually measured values for the evaluation item that are obtained through the above-described trial machining, and the calculated degree of achievement is stored in association with the corresponding set of machining conditions in the achievement degree data storage 11. Note that the machining condition data and the achievement degree data differ in accordance with a tool type, a tool material, and a workpiece material. Therefore, the data are obtained for each tool type, each tool material, and each workpiece material through trial machining as described above, and the obtained data are stored in the achievement degree data storage 11 in the form of a data table for each tool type, each tool material, and each workpiece material.

The display picture generator 10 is a function unit that generates display pictures to be displayed on the display device 8; the display pictures generated by the display picture generator 10 are displayed on the display device 8 under control by the display controller 9.

The display picture generator 10 generates various display pictures. For example, the display picture generator 10 generates an initial picture which is displayed first after the numerical control apparatus 1 is activated and on which other display pictures can be selected, a picture for displaying the achievement degree data shown in FIG. 2 stored in the achievement degree data storage 11, a picture for displaying the data stored in the basic data storage 12, and a picture for displaying NC programs stored in the NC program storage 14, as well as display pictures as shown in FIGS. 3 to 6; the generated display pictures are displayed on the display device 8. Note that the display pictures other than the initial picture are each generated by the display picture generator 10 when the display picture generator 10 receives, from the input controller 6, a signal selected on a display picture displayed on the display device 8.

Figure 3:
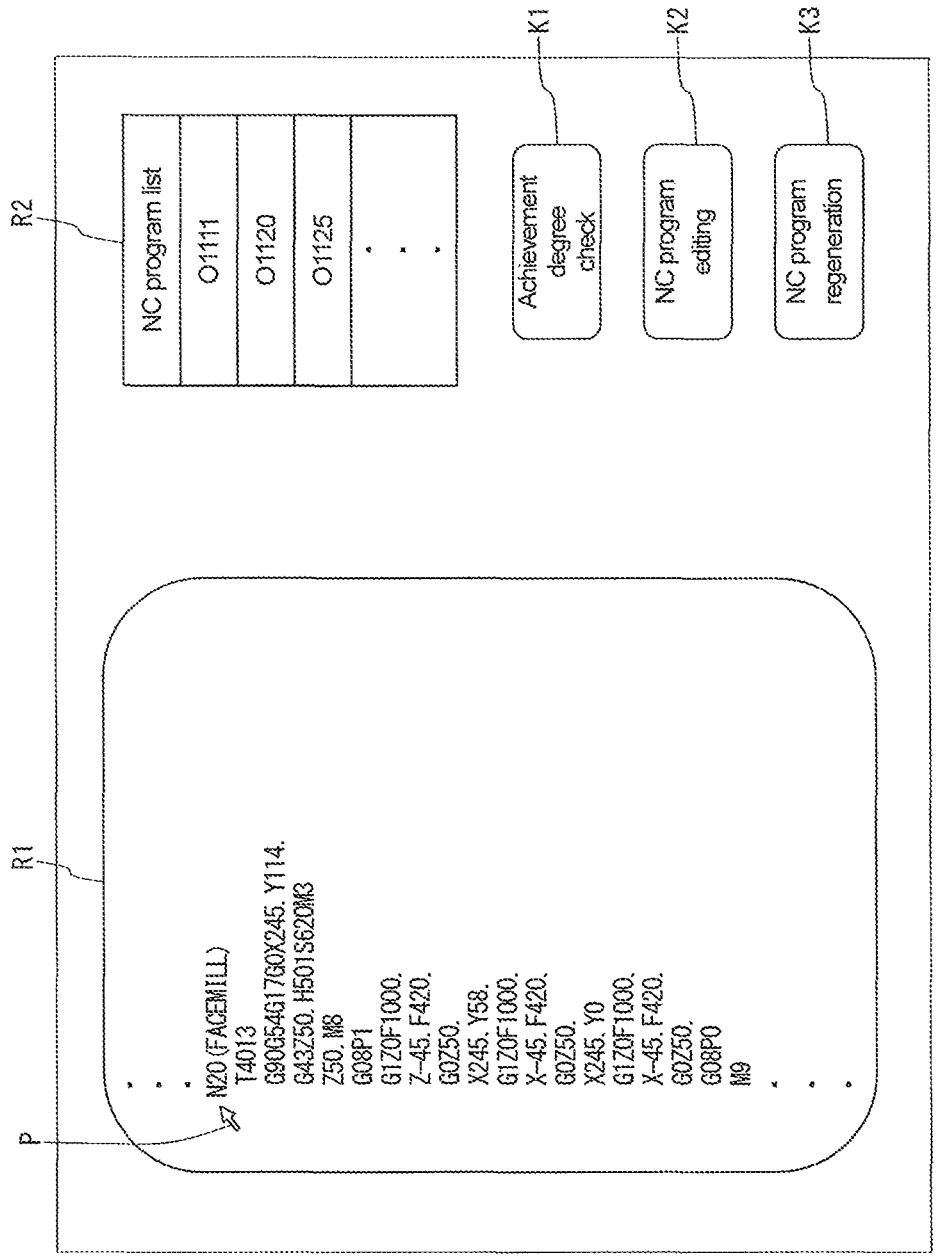
FIG. 3 is an illustration showing an example of display pictures displayed on a display device in the embodiment.

The display picture shown in FIG. 3 is a display picture for editing or regenerating an NC program stored in the NC program storage 14. This display picture has a region R1 for displaying an NC program and a region R2 for displaying an NC program list. Further, a key K1 for achievement degree check, a key K2 for NC program editing, and a key K3 for NC program regeneration are displayed in this display picture.

The display picture generator 10 creates a list of program numbers of the NC programs stored in the NC program storage 14 by referring to the NC program storage 14, and displays the created program number list in the region R2. When a program number is selected from the displayed list with a pointer P or the like, the display picture generator 10 reads out the selected NC program from the NC program storage 14 and displays the NC program in the region R1.

Figure 4:
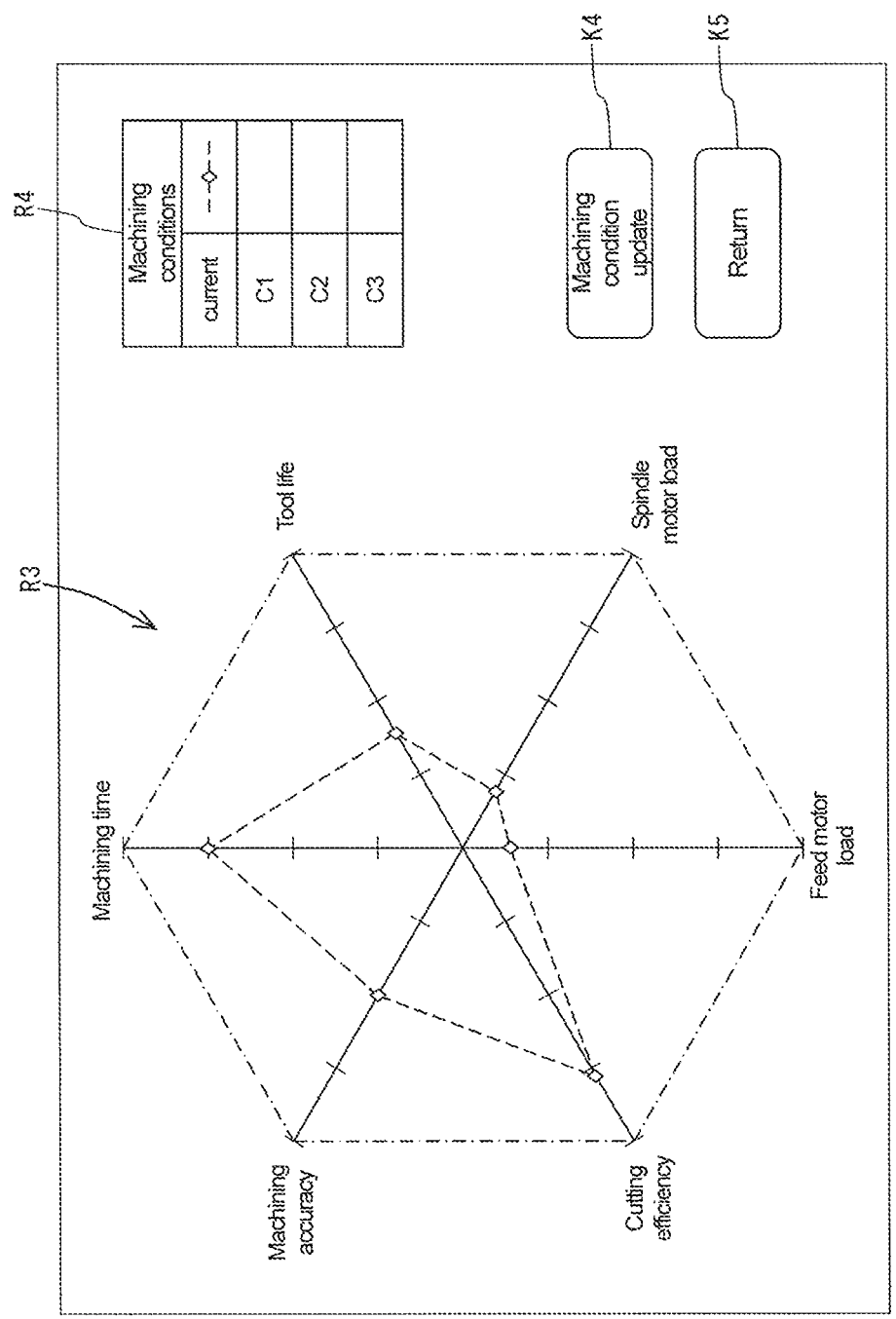
FIG. 4 is an illustration showing an example of the display pictures displayed on the display device in the embodiment.

When a machining step (step number) in the NC program displayed in the region R1 is selected with the pointer P or the like and then the achievement degree check key K1 is selected, the display picture generator 10 generates the display picture shown in FIG. 4 and displays the display picture on the display device 8 via the display controller 9. Note that, in the example shown in FIG. 3, a step N20, which is a machining step for face milling, is selected with the pointer P.

The display picture shown in FIG. 4 has a region R3 for graphically displaying the degrees of achievement of the evaluation items obtained under a selected set of machining conditions, and a region R4 for displaying the codes corresponding to the sets of machining conditions stored in the achievement degree data storage 11, that is, a list of the sets of machining conditions. Further, a key K4 for machining condition update and a key K5 for returning to the previous picture, that is, the display picture shown in FIG. 3, are displayed in this display picture.

In the region R4, letters "current" for indicating a set of machining conditions set for the machining step selected on the display picture shown in FIG. 3 is displayed. Under the letters "current", the codes corresponding to the sets of machining conditions shown in FIG. 2 are displayed. The display of the codes is scrolled by an operation signal input from the input device 5. Further, next to the letters "current" and each code, the types an index figure and a line to be displayed in the region R3 are displayed.

In the region R3, an image showing the degrees of achievement of the evaluation items under the "current" set of machining conditions and the degrees of achievement of the evaluation items under a set of machining conditions selected with the pointer P is displayed. This image is generated by the display picture generator 10. The display picture generator 10 first generates a figure in which an axial figure as a scale is set for each of the evaluation items, the scale having a length corresponding to the range of the degree of achievement of the evaluation item, for example, whose maximum value and minimum value are respectively "100" and "0" as described above, and the axial figures are radially arranged at equal angular intervals with respect to a predetermined reference point with minimum-value-side ends thereof located at the reference point. Note that, near the maximum-value-side end of each of the axial figures, letters for indicating the corresponding evaluation item are displayed. Further, the adjacent axial figures are connected to each other with line segments (one-dot chain lines in the example shown in FIG. 4) at the maximum-value-side ends thereof. The thus-displayed figure has a regular hexagonal shape and the axial figures form the diagonals of the regular hexagon.

Subsequently, by referring to the data stored in the basic data storage 12, which is described in detail later, based on workpiece information included in the NC program selected on the display picture shown in FIG. 3, the display picture generator 10 recognizes the material of the corresponding workpiece. Further, by referring to the data stored in the basic data storage 12 based on a tool number used in the machining step of the NC program selected on the display picture shown in FIG. 3, the display picture generator 10 also recognizes the type and material of the tool corresponding to the tool number. Furthermore, the display picture generator 10 interprets the NC program and the like for the selected machining step to recognize the current machining conditions, i.e., the current cutting speed, feed rate, width of cut, and depth of cut. Thereafter, by referring to the achievement degree data storage 11 based on the recognized tool type, tool material, workpiece material, and machining conditions, the display picture generator 10 recognizes a data table corresponding to the tool type, tool material, and workpiece material (hereinafter, such a data table is referred to as "corresponding data table"), and recognizes the degrees of achievement of the evaluation items under the current machining conditions from the corresponding data table. Note that, in the case where the value of the interpreted cutting speed, feed rate, width of cut, or depth of cut does not correspond to the data stored in the achievement degree data storage 11, the degrees of achievements corresponding to the nearest value are selected.

Subsequently, the display picture generator 10 generates a figure in which an index figure (white diamond-shaped figure in the example shown in FIG. 4) for indicating the degree of achievement of each evaluation item under the obtained current machining conditions is arranged at a length position corresponding to a proportion corresponding to the degree of achievement on the corresponding axial figure, and the adjacent index figures are connected to each other with line segments (broken lines in the example shown in FIG. 4).

Figure 5:
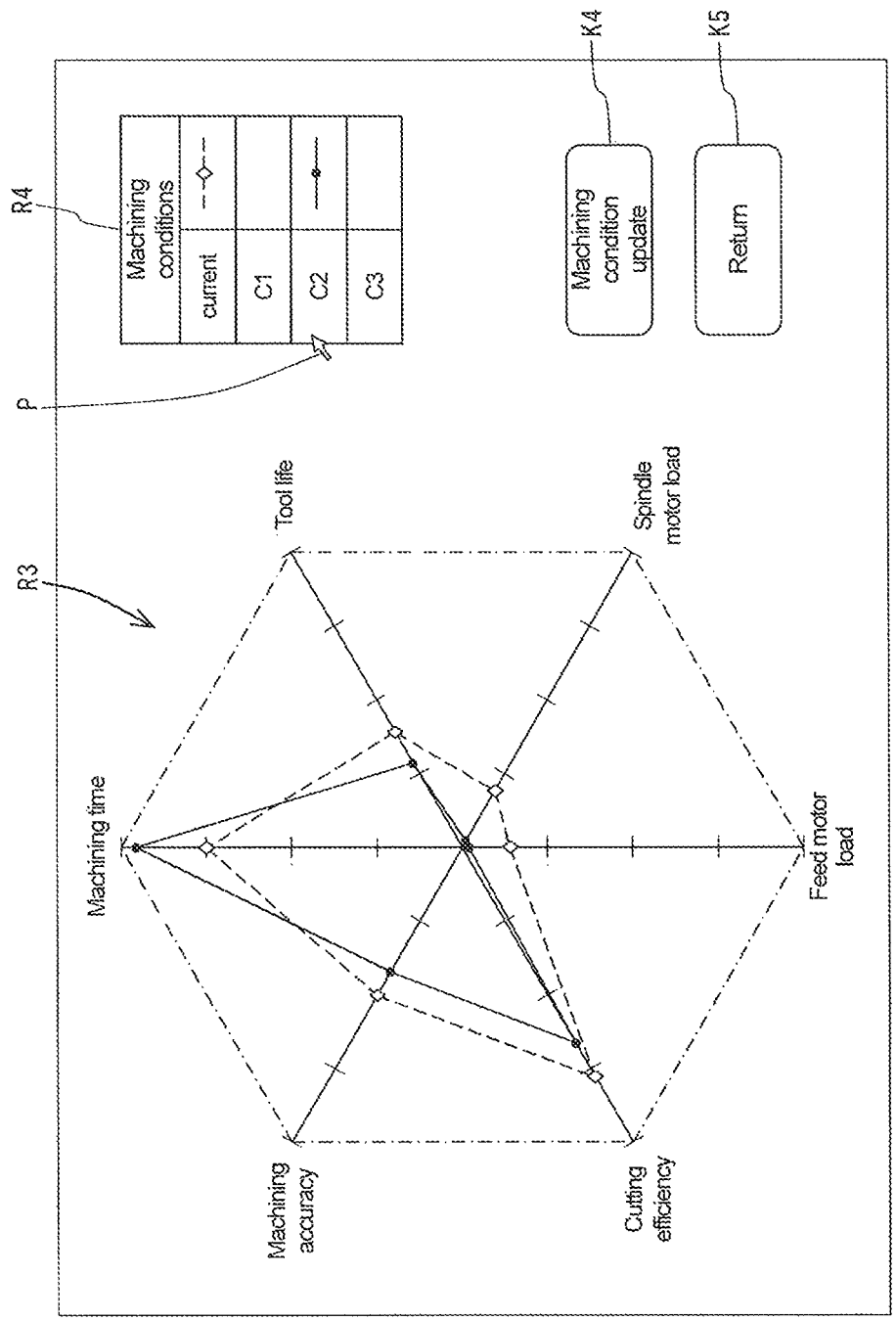
FIG. 5 is an illustration showing an example of the display pictures displayed on the display device in the embodiment.
Figure 6:
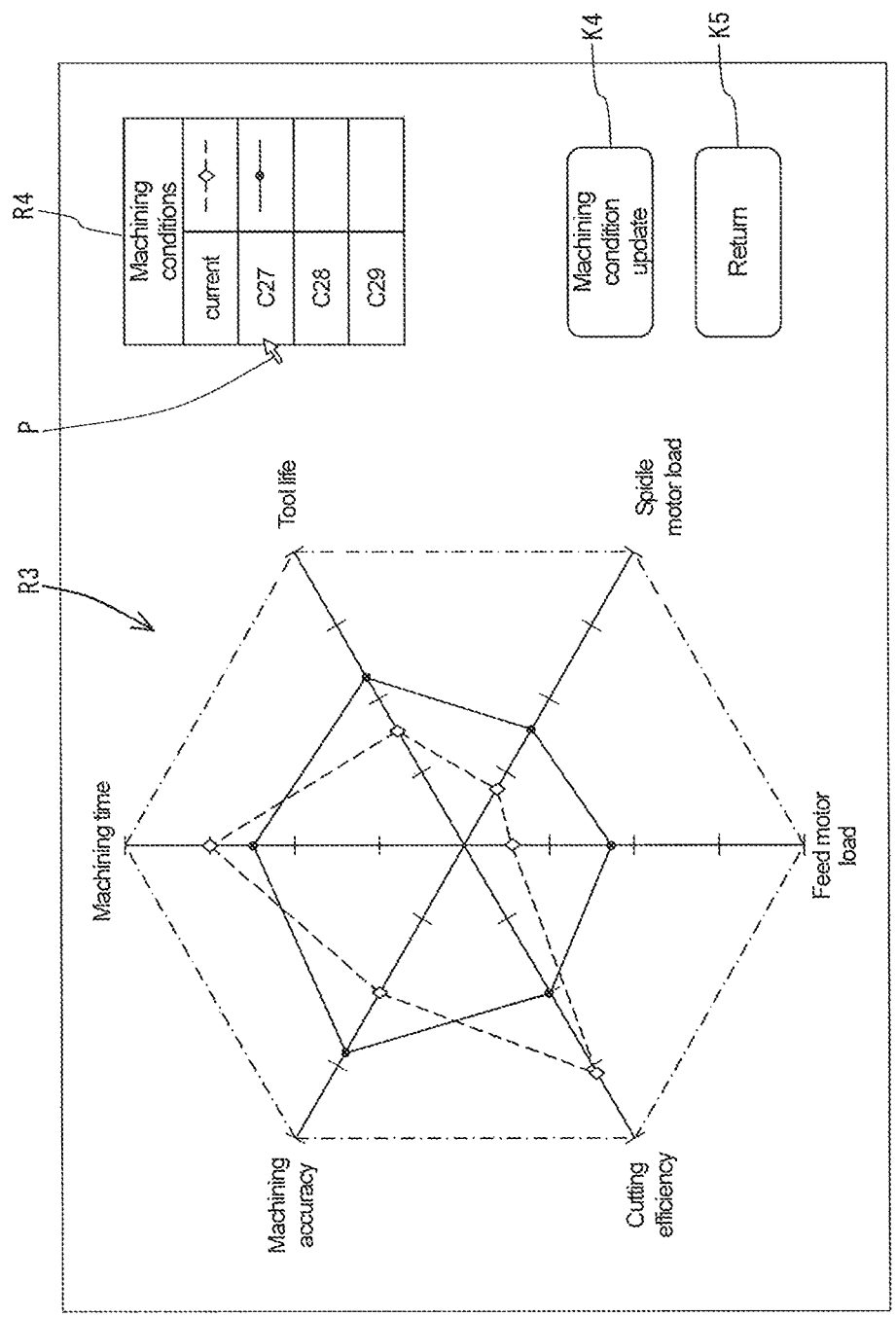
FIG. 6 is an illustration showing an example of the display pictures displayed on the display device in the embodiment.

Further, when a certain set of machining conditions is selected from the machining condition list displayed in the region R4 with the pointer P as described above, the display picture generator 10 recognizes the degrees of achievement of the evaluation items obtained under the selected set of machining conditions by referring to the corresponding data table stored in the achievement degree data storage 11 based on the selected set of machining conditions, and generates a figure in which an index figure (black circular figure in the examples shown in FIGS. 5 and 6) for indicating the recognized degree of achievement of each evaluation item is arranged at length position corresponding to a proportion corresponding to the recognized degree of achievement on the corresponding axial figure, and the adjacent index figures are connected to each other with line segments (solid lines in the examples shown in FIGS. 5 and 6). Note that, in this process, the types of the line segment and index figure for the selected set of machining conditions (solid line and black circle in the examples shown in FIGS. 5 and 6) are displayed next to the selected code in the region R3.

Note that each time a set of machining conditions is selected from the machining condition list displayed in the region R4 with the pointer P, the display picture generator 10 generates such an index and line-segment figure corresponding to the selected set of machining conditions. FIG. 5 shows a figure generated when the set of machining conditions C2 is selected, while FIG. 6 shows a figure generated when the set of machining conditions C27 is selected.

Next, the components other than the machining status display apparatus 3 are described.

The basic data storage 12 is a functional unit that stores basic data necessary for generating an NC program, the basic data being input from the input device 5 under control by the input controller 6.

Note that the basic data stored in the basic data storage 12 include common information, such as machine-tool-specific information, information relating to machining steps such as outer diameter machining, inner diameter machining, grooving, and surface machining, information relating to a machining method (for example, turning, contouring, or scanning) in each machining step, information relating to tool specifications such as tool number, tool type, tool material, and tool dimensions, and information relating to machining conditions (cutting speed, feed rate, width of cut, and depth of cut) corresponding to each workpiece material and each tool material; the common information being a general database.

The basic data further includes individual information for each specific machined product for generating an NC program, such as information relating to material, shape, and dimensions of a workpiece to be machined and information relating to machining-finished shape and dimensions and set machining steps (for example, machined regions and machining methods), as well as information relating to a tool used in each machining step. This individual information is stored in association with a program number in the basic data storage 12.

The NC program generator 13 automatically generates an NC program based on the basic data stored in the basic data storage 12, and stores the generated NC program into the NC program storage 14.

Specifically, when a program number is designated and an NC program generation command is input from the input device 5, the NC program generator 13 recognizes the individual information corresponding to the designated program number stored in the basic data storage 12, and generates a tool path for each of set machining steps and sets appropriate cutting speed and feed rate for the generated tool path by referring to the common information as appropriate, and then converts the obtained tool paths, cutting speeds, and feed rates into NC codes through an appropriate processing, thereby generating an NC program.

Further, when the NC program regeneration key K3 is selected with the pointer P on the display picture shown in FIG. 3, the NC program generator 13 regenerates an NC program for the machined product corresponding to the currently selected program number in a similar manner to the above-described NC program generation.

The NC program storage 14 is a functional unit that stores NC programs; each NC program generated by the NC program generator 13 is stored in association with the program number in the NC program storage 14.

When the machining condition update key K4 is selected with the pointer P on the display picture shown in FIG. 5 or the display picture shown in FIG. 6, the basic data updater 15 updates the machining condition data stored as the common information in the basic data storage 12 with the machining condition data which has been also selected with the pointer P, that is, the machining condition data for the tool type, tool material and workpiece material corresponding to the selected set of machining conditions is updated.

When the NC program editing key K2 is selected with the pointer P on the display picture shown in FIG. 3 after the machining condition update key K4 has been selected on the display picture shown in FIG. 5 or the display picture shown in FIG. 6 and thereby the machining condition data stored in the basic data storage 12 has been updated by the basic data updater 15, the NC program editor 16 edits the NC program for the currently selected machining step displayed in the region R1 in accordance with the updated machining conditions. For example, the spindle rotation speed in the NC program is changed so as to enable the updated cutting speed, and the feed rate in the NC program is changed so as to enable the updated feed rate. Further, if possible, the tool path is changed so as to enable the updated width of cut and/or depth of cut.

In this NC program generating and editing apparatus 2 having the above-described configuration, the machining status display apparatus 3 displays the degrees of achievement of the evaluation items obtained under a selected set of machining conditions on the display device 8.

That is, first, the display picture shown in FIG. 3 that is generated by the display picture generator 10 is displayed on the display device 8. This display picture is for editing or regenerating an NC program stored in the NC program storage 14. When an NC program is selected from the NC program list displayed in the region R2 with the pointer P, the selected NC program is displayed in the region R1.

When one machining step (step number) in the NC program displayed in the region R1 is selected with the pointer P and then the achievement degree check key K1 is also selected with the pointer P, a figure as shown in FIG. 4 for showing the degrees of achievement of the evaluation items obtained in the selected machining step is generated by the display picture generator 10 in the above-described manner, and the generated figure is displayed on the display device 8.

Each of the axial figures displayed in the region R3 of the display picture shown in FIG. 4 represents a scale and an outer end thereof indicates the maximum value "100". Each of the diamond-shaped index figures indicates the degree of achievement of each evaluation item obtained under the machining conditions set for the machining step selected in the above-described manner (the current machining conditions). Thus, with this machining status display apparatus 3, by selecting a machining step of an existing NC program, the operator can comprehensively and visually recognize the degrees of achievement of the evaluation items obtained in the selected machining step, that is, the degrees of achievement of machining efficiency, machining costs, and machining accuracy. Note that, in the example shown in FIG. 4, the machining time and the cutting efficiency are preferable, while it cannot be said that the tool life, the machining accuracy, the spindle motor load, and the feed motor load are preferable; therefore, it can be recognized that the selected machining step provides a comprehensively ill-balanced machining.

For example, when the set of machining conditions C2 is selected with the pointer P on the display picture shown in FIG. 4 as shown in FIG. 5, the display picture generator 10 recognizes the degree of achievement of each of the evaluation items obtained under the set of machining conditions C2 by referring to the data stored in the achievement degree data storage 11, and generates a figure in which a black circular index figure for indicating the recognized degree of achievement of each evaluation item is arranged at a length position corresponding to a proportion corresponding to the degree of achievement on the corresponding axial figure and the adjacent index figures are connected to each other with solid lines; the generated figure is displayed on the display device 8. Note that the black circular index figures in FIG. 5 indicate the degrees of achievement for the case where the set of machining conditions C2 is selected, while the black circular figures in FIG. 6 indicate the degrees of achievement for the case where the set of machining conditions C27 is selected.

Thus, the degrees of achievement obtained under each of the sets of machining conditions stored in the achievement degree data storage 11 are selected and displayed as appropriate in a state where the degrees of achievement obtained under the current machining conditions are displayed, which allows the operator to compare the degrees of achievement obtained under the current machining conditions with the degrees of achievement obtained under different machining conditions and recognize them. Therefore, the operator can easily, comprehensively judge appropriateness of each of the sets of machining conditions, and can easily recognize a set of machining conditions under which the evaluation items are comprehensively well-balanced.

In this connection, in the example shown in FIG. 5, the degrees of achievement of the evaluation items obtained under the current machining conditions are comprehensively better balanced than those obtained under the set of machining conditions C2; therefore, it can be recognized that the current machining conditions are superior to the set of machining conditions C2. On the other hand, in the example shown in FIG. 6, the degrees of achievement of the evaluation items obtained under the set of machining conditions C27 are comprehensively better balanced than those obtained under the current machining conditions; therefore, it can be recognized that the set of machining conditions C27 is superior to the current machining conditions.

If the machining condition update key K4, which is shown in FIGS. 4 to 6, is selected with the pointer P after a set of machining conditions under which the evaluation items are comprehensively well-balanced is confirmed in the above-described manner, the machining condition data stored as the common information in the basic data storage 12 is updated with the selected set of machining conditions by the basic data updater 15.

Note that, in this embodiment, a list of sets of machining conditions to be selected is displayed and an appropriate set of machining conditions is selected from this list; therefore, the operator can easily specify a set of machining conditions to be selected.

Subsequently, if the key K5 for returning to the display picture shown in FIG. 3 is selected with the pointer P, the display controller 9 displays the display picture shown in FIG. 3 on the display device 8 again.

Thereafter, if the NC program regeneration key K3 is selected with the pointer P on the display picture shown in FIG. 3, with respect to the machined product corresponding to the currently selected program number, an NC program corresponding to the program number is regenerated by the NC program generator 13 based on the data stored in the basic data storage 12 (including the updated machining condition data), and the corresponding existing NC program stored in the NC program storage 14 is updated with the regenerated NC program.

On the other hand, if the NC program editing key K2 is selected with the pointer P on the display picture shown in FIG. 3, the NC program for the currently selected machining step displayed in the region R1 is edited in accordance with the updated machining conditions, that is, the spindle rotation speed in the NC program is changed so as to enable the updated cutting speed, the feed rate in the NC program is changed so as to enable the updated feed rate, and/or, if possible, the tool path is changed so as to enable the updated width of cut and/or depth of cut; the edited NC program is stored in the NC program storage 14.

Thus, with this NC program generating and editing apparatus 2, it is possible to, with the machining status display apparatus 3, select preferable machining conditions which are based on comprehensive consideration of evaluation items associated with machining efficiency, machining costs, and machining accuracy, and update corresponding machining conditions stored in the basic data storage 12 with the selected machining conditions and regenerate an NC program with the updated machining conditions. Therefore, it is possible to automatically generate a preferable NC program in which the evaluation items associated with machining efficiency, machining costs, and machining accuracy are comprehensively well-balanced.

Further, with this NC program generating and editing apparatus 2, it is possible to automatically, partially correct a portion corresponding to a freely selected machining step in an existing NC program such that the machining step provides a preferable machining in which the evaluation items associated with machining efficiency, machining costs, and machining accuracy are comprehensively well-balanced.

Hereinbefore, a specific embodiment of the present disclosure has been described. However, the present disclosure is not limited thereto and can be implemented in other modes.

For example, in the figure relating to the degrees of achievement displayed in the region R3 in the above-described embodiment, the axial figures for the evaluation items are radially arranged at equal angular intervals with respect to a predetermined reference point with the minimum-value-side ends thereof located at the reference point; however, the present disclosure is not limited thereto. The axial figures can be arranged in any manner as long as the degrees of achievement of the evaluation items can be comprehensively evaluated.

Figure 7:
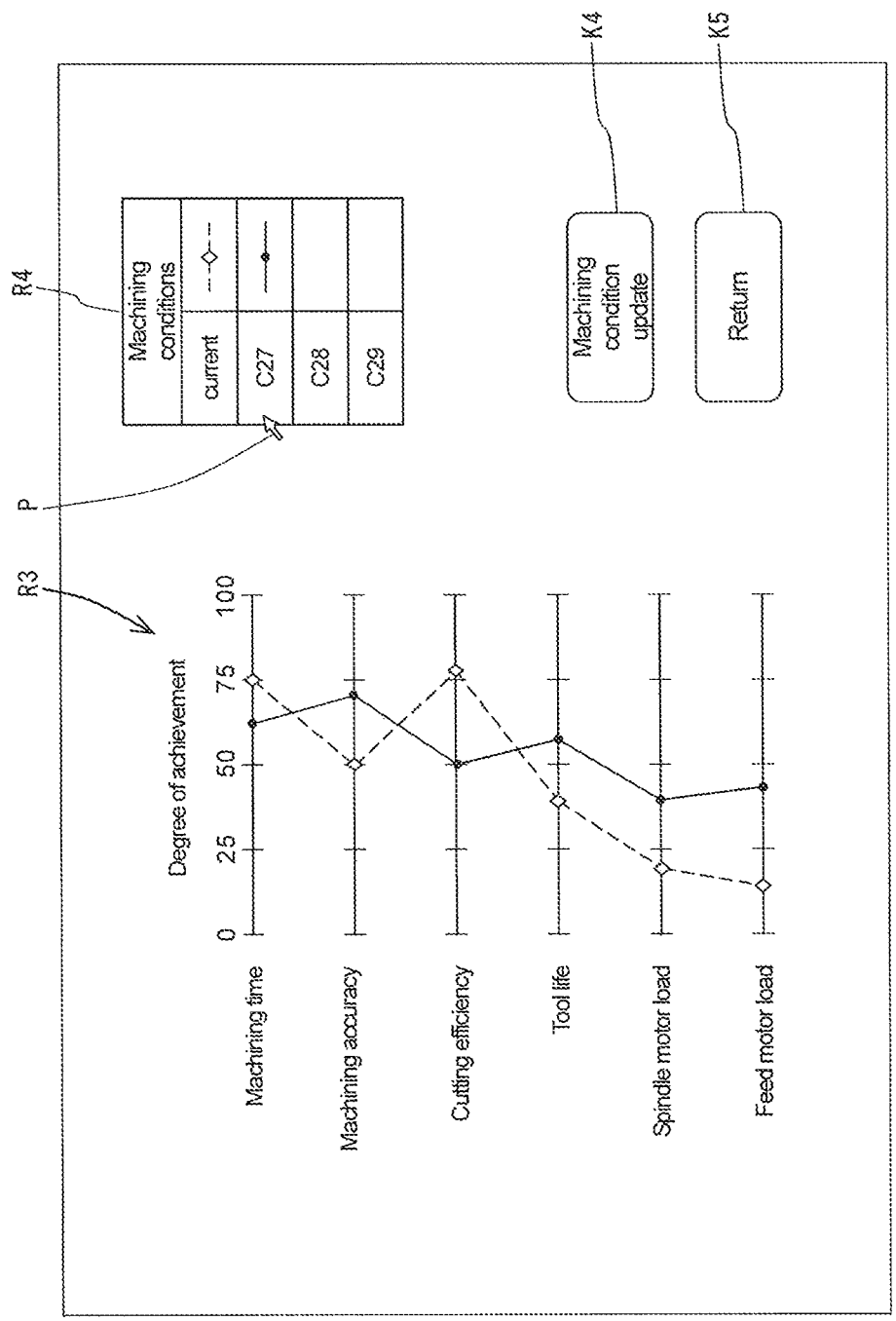
FIG. 7 is an illustration showing another type of display picture displayed on the display device in the embodiment.

For example, FIG. 7 shows another example of the mode of arranging the axial figures. In the example shown in FIG. 7, the axial figures are arranged in parallel with each other with both ends thereof located uniformly in an axial direction. With this arrangement, the operator can visually recognize whether the degrees of achievement of the evaluation items are comprehensively well-balanced.

Note that, in FIG. 7, the white diamond-shaped index figures for indicating the degrees of achievement under the current machining conditions are connected to the adjacent one or ones with broken lines, and the black circular index figures for indicating the degrees of achievement under the selected set of machining conditions C27 are connected to the adjacent one or ones with solid lines.

Further, as for the mode of displaying the degrees of achievement in the region R3, the degrees of achievement may be indicated with letters instead of the figures for indicating the degrees of achievement, the display picture generator 10 being configured to generate such a display picture.

Further, the evaluation items are not limited to those mentioned above, and more or fewer evaluation items may be used.

What is claimed is:

1. A machining status display apparatus, comprising:
an achievement degree data storage storing machining condition data relating to a plurality of predetermined sets of machining conditions and achievement degree data relating to degrees of achievement of evaluation items respectively related to machining efficiency, machining costs, and machining accuracy in machining using a machine tool, the achievement degree data indicating the degree of achievement of each of the evaluation items as an index positioned within a range defined based on attainable maximum and minimum values of the evaluation item, the achievement degree data for the degrees of achievement of the evaluation items obtained in machining under each of the predetermined sets of machining conditions and the machining condition data for the set of machining conditions being associated with each other;
a display part having a display and displaying, on the display, the degrees of achievement of the evaluation items corresponding to a selected set of machining conditions by referring to the machining condition data and achievement degree data stored in the achievement degree data storage; and
an input part inputting a selection signal for selecting a set of machining conditions from among the plurality of sets of machining conditions,
the display part being further configured to, when the selection signal is input from the input part, recognize the degree of achievement of each of the evaluation items obtained under the set of machining conditions corresponding to the selection signal by referring to the data stored in the achievement degree data storage based on the input selection signal, and display the recognized degree of achievement of each of the evaluation items with a figure, the figure being composed of an axial figure having a length corresponding to the range defined based on the maximum and minimum values of the evaluation item, and an index figure arranged at a length position corresponding to a proportion corresponding to the degree of achievement of the evaluation item on the axial figure.

2. The machining status display apparatus of claim 1, wherein the display part is configured to display the axial figures for the evaluation items such that the axial figures are arranged in parallel with each other with both ends thereof located uniformly in an axial direction.

3. The machining status display apparatus of claim 2, wherein the display part is configured to display line segments connecting the index figures adjacent to each other.

4. The machining status display apparatus of claim 1, wherein the display part is configured to display the axial figures for the evaluation items such that the axial figures are radially arranged at equal angular intervals with respect to a determined reference point with minimum-value-side ends thereof located at the reference point.

5. The machining status display apparatus of claim 4, wherein the display part is configured to display line segments connecting the index figures adjacent to each other.

6. The machining status display apparatus of claim 1, wherein the display part is configured to display a list of the sets of machining conditions or a list of codes corresponding to the sets of machining conditions.

7. The machining status display apparatus of claim 6, wherein the input part is configured to be capable of inputting a selection signal for selecting a set of machining conditions from the list displayed on the display part.

8. An NC program generating apparatus, comprising:
the machining status display apparatus of claim 1;
a basic data storage storing basic data for automatically generating an NC program, the basic data including the machining condition data;
an NC program generator generating an NC program based on the basic data stored in the basic data storage; and
a basic data updater updating the machining condition data stored in the basic data storage,
the input part being further configured to be capable of inputting an update request signal for causing the machining condition data stored in the basic data storage to be updated with the set of machining conditions corresponding to the selection signal, and
the basic data updater being configured to, when the update request signal is input from the input part, update the machining condition data stored in the basic data storage with the machining condition data corresponding to the selection signal.

9. An NC program editing apparatus, comprising:
the machining status display apparatus of claim 1;
an NC program storage storing an NC program; and
an NC program editor editing the NC program stored in the NC program storage,
the input part being further configured to be capable of inputting an editing request signal specifying a portion to be edited of the NC program stored in the NC program storage and requesting to edit the specified portion with the set of machining conditions corresponding to the selection signal, and
the NC program editor being configured to, when the editing request signal is input from the input part, edit the specified portion of the NC program stored in the NC program storage with the machining condition data corresponding to the selection signal.

10. The machining status display apparatus of claim 1, wherein the evaluation item related to the machining efficiency at least includes either of machining time and cutting efficiency, the evaluation item related to the machining costs at least includes any of tool life, spindle motor load, and feed motor load, and the evaluation item related to the machining accuracy at least includes surface roughness.

* * * * *